(12) United States Patent
Yang

(10) Patent No.: US 12,126,578 B2
(45) Date of Patent: Oct. 22, 2024

(54) SOCIAL INFORMATION PROCESSING METHOD AND APPARATUS, AND ELECTRONIC DEVICE

(71) Applicant: JOYME PTE. LTD., Singapore (SG)

(72) Inventor: Shan Yang, Singapore (SG)

(73) Assignee: JOYME PTE. LTD., Singapore (SG)

( * ) Notice: Subject to any disclaimer, the term of this patent is extended or adjusted under 35 U.S.C. 154(b) by 0 days.

(21) Appl. No.: 17/784,490

(22) PCT Filed: May 12, 2020

(86) PCT No.: PCT/CN2020/089770
§ 371 (c)(1),
(2) Date: Jun. 10, 2022

(87) PCT Pub. No.: WO2021/135028
PCT Pub. Date: Jul. 8, 2021

(65) Prior Publication Data
US 2023/0033074 A1   Feb. 2, 2023

(30) Foreign Application Priority Data
Dec. 30, 2019  (CN) .......................... 201911402224.4

(51) Int. Cl.
*H04L 51/04* (2022.01)
*G06F 3/0488* (2022.01)
*H04L 51/52* (2022.01)

(52) U.S. Cl.
CPC ............ *H04L 51/04* (2013.01); *G06F 3/0488* (2013.01); *H04L 51/52* (2022.05)

(58) Field of Classification Search
CPC ......... H04L 51/04; H04L 51/52; H04L 51/10; H04L 51/18; G06F 3/0488;
(Continued)

(56) References Cited

U.S. PATENT DOCUMENTS

2013/0191481 A1* 7/2013 Prevost ................... H04L 51/04
709/206
2014/0298364 A1* 10/2014 Stepanov ........... H04N 21/4668
725/10
(Continued)

FOREIGN PATENT DOCUMENTS

CN   102509227   6/2012
CN   107995377   5/2018
(Continued)

OTHER PUBLICATIONS

CNIPA, First Office Action for CN Application No. 201911402224. 4, Feb. 1, 2021.
(Continued)

*Primary Examiner* — Jungwon Chang
(74) *Attorney, Agent, or Firm* — Hodgson Russ LLP

(57) ABSTRACT

A method for processing social information comprises: sending a message to an interaction object; if no feedback message of the interaction object to the message is received within a preset time, displaying a reply control in a display bar of an interaction interface, wherein the reply control comprises social information and a control for selecting the number of pieces of social information; and in response to a user operation of the reply control, sending reply information to the interaction object.

18 Claims, 4 Drawing Sheets

(58) Field of Classification Search
CPC ...... G06F 3/04847; G06F 9/451; G06F 17/10; H04N 21/4788; H04N 21/4223; H04N 21/4668
See application file for complete search history.

(56) References Cited

U.S. PATENT DOCUMENTS

| | | | | |
|---|---|---|---|---|
| 2016/0371272 A1* | 12/2016 | Grainger | ................. | H04L 51/18 |
| 2018/0160158 A1* | 6/2018 | Liu | ................. | H04N 21/44218 |
| 2018/0343074 A1* | 11/2018 | Barnea | ................. | H04L 51/226 |
| 2019/0122412 A1* | 4/2019 | Woo | ................. | H04L 51/52 |
| 2020/0162411 A1* | 5/2020 | DeLuca | ................. | H04L 51/18 |
| 2020/0204871 A1* | 6/2020 | Bai | ................. | H04N 21/4223 |
| 2020/0274833 A1* | 8/2020 | Koo | ................. | H04L 51/10 |
| 2020/0301566 A1* | 9/2020 | Monk | ................. | G06F 17/10 |
| 2020/0396187 A1* | 12/2020 | Woo | ................. | H04L 51/10 |

FOREIGN PATENT DOCUMENTS

| | | |
|---|---|---|
| CN | 110618770 | 12/2019 |
| CN | 110943912 | 3/2020 |
| KR | 20150080288 | * 12/2013 |

OTHER PUBLICATIONS

CNIPA, Second Office Action for CN Application No. 201911402224. 4, Sep. 17, 2021.
WIPO, International Search Report and Written Opinion for PCT/CN2020/089770, Sep. 28, 2020.
"Dou figure!" retrieved from the internet: <https://www.doutula.com/index.php/photo/1658000>, 2017.

* cited by examiner

SOCIAL INFORMATION PROCESSING METHOD AND APPARATUS, AND ELECTRONIC DEVICE

CROSS-REFERENCE TO RELATED APPLICATIONS

This application is a U.S. national phase entry of International Application No. PCT/CN2020/089770 filed on May 12, 2020, which claims priority to Chinese Patent Application No. 201911402224.4, filed on Dec. 30, 2019, the entire contents of which are incorporated herein by reference.

TECHNICAL FIELD

The embodiments of the disclosure relate to the technical field of information processing, in particular to a method and an apparatus for processing social information and an electronic device.

BACKGROUND

With the development of science and technology, people's social skills and means are increasingly rich and powerful, and people's social needs are becoming stronger and stronger. The number of people contacted through the Internet is very large. The current social means are also more abundant. Live broadcasting is also received more and more attention. During the live broadcast, fans often pay attention to their favorite anchors, and may send private messages to the anchors in the hope of getting a reply from the anchors.

However, the current live private messages only have a function of sending text and pictures, which can no longer meet people's growing interaction needs.

SUMMARY

According to a first aspect of the disclosure, a method for processing social information includes: sending a message to an interaction object; in response that a feedback message is not received from the interaction object for the message within a preset time, displaying a reply control in a display bar of an interaction interface, in which the reply control includes: social information and a control for selecting a number of pieces of social information; and in response to a user operation of the reply control, sending reply information to the interaction object, in which the reply information includes social information selected by a user and a number of pieces of selected social information.

According to a second aspect of the disclosure, an electronic device includes a processor, and a memory configured to store with a computer program executable by the processor. When the computer program is executed by the processor, the method for processing social information according to the first aspect is implemented.

According to a third aspect of the disclosure, a non-transitory computer-readable storage medium is provided, on which a computer program is stored. When the program is executed by a processor, the method for processing social information according to the first aspect is implemented.

Additional aspects and advantages of embodiments of the disclosure may be given in part in the following descriptions, become apparent in part from the following descriptions, or be learned from the practice of the embodiments of the disclosure.

BRIEF DESCRIPTION OF THE DRAWINGS

The above and/or additional aspects and advantages of embodiments of the disclosure may become apparent and more readily appreciated from the following descriptions made with reference to the drawings, in which.

DETAILED DESCRIPTION

Figure 1:
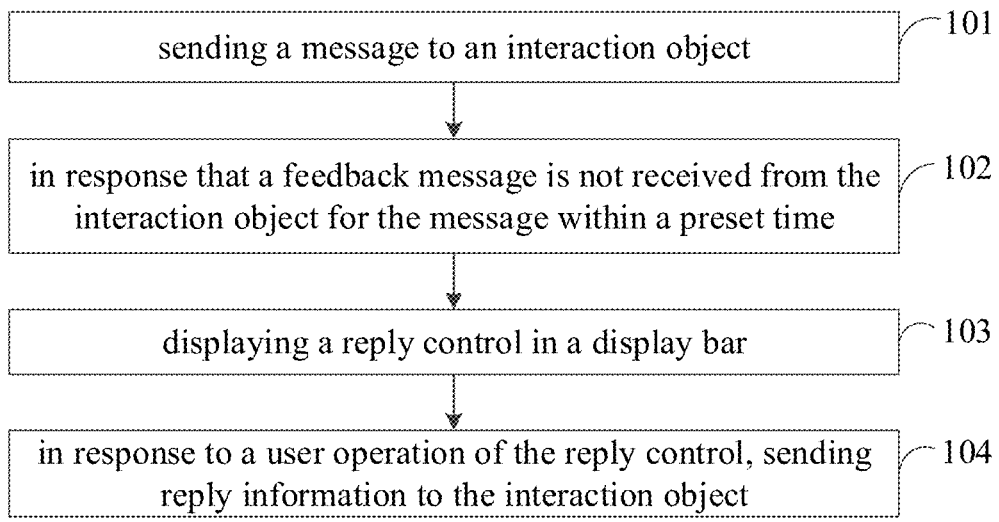
FIG. 1 is a schematic flowchart of a method for processing social information according to an embodiment of the present disclosure.

Embodiments of the disclosure may be described in detail, examples of which are illustrated in the drawings. The same or similar reference numerals throughout the specification refer to the same or similar elements or elements having the same or similar functions. Embodiments described herein with reference to drawings are explanatory, serve to explain the disclosure, and are not construed to limit embodiments of the disclosure.

The following describes a method and an apparatus for processing social information, and an electronic device according to the embodiments of the disclosure with reference to the accompanying drawings.

FIG. 1 is a schematic flowchart of a method for processing social information according to an embodiment of the disclosure. The method may be executed by an electronic device.

As shown in FIG. 1, the method includes the following steps.

At 101, a message is sent to an interaction object.

The interaction object refers to a user who has interaction needs, such as an anchor, fans of the anchor, and the like. The content of the message is different, and the type of the corresponding content is different. The message may be in a chat type and in an emoticon type. The message in the chat type is, for example, a text message. The message in the emoticon type is an emoji symbol.

At 102, in response that a feedback message is not received from the interaction object for the message within a preset time, the steps at 103 to 104 are performed.

The preset time may be set according to the actual situations, such as 30 s, 1 min, etc., which will not be repeated here.

At 103, a reply control is displayed in a display bar.

The reply control includes: social information and a control for controlling a number of pieces of social information.

At 104, in response to a user operation of the reply control, reply information is sent to the interaction object. The reply information includes social information selected by a user and a number of pieces of social information.

In the method for processing social information according to this embodiment, the message is sent to the interaction object, and if the feedback message is not received from the interaction object for the message within the preset time, the display bar is displayed on the page, in which the display bar is displayed with reply controls for selecting multiple pieces of social information. In this embodiment, the pieces of social information may be selected in batches. In response to the user operation of the reply control, reply information is sent to the interaction object, in which the reply information includes social information selected by the user and a number of pieces of social information. Therefore, social information in this embodiment may be sent in batches, quick replies of a large number of social information that meet the needs are provided for users, the timeliness of information interaction is improved, and the stickiness to the platform is increased.

Further, the above message sent to the interaction object is a private message. If a feedback message is not received from the interaction object for the private message within the preset time, a display bar may be displayed on a page of the private message, and a reply control may be displayed in the display bar. In this embodiment, giving gifts in batches mainly performs on the interaction page of the private message, so as to solve the problem that gifts may be not given in batches during private message interaction.

This embodiment may be illustrated by the following scenarios.

In a scenario where fans give gifts to the anchor, the fans send private messages to the anchor. If the anchor does not reply to the message within the preset time, a display bar may be displayed on the page of the private message and a reply control may be displayed in the display bar. The reply control includes a type of virtual gifts and a control for controlling the number of virtual gifts. The fans may select the number of virtual gifts through this control, and then click a send button to send virtual gifts to the anchor in batches on the page of the private message. As such, it is solved the problem that the fans may not send gifts to the anchor in batches in the private message interaction.

In another scenario where the anchor gives gifts to fans, the anchor sends a private message to the fans. If the fans do not reply to the message within the preset time, a display bar may be displayed on the page of the private message, and a reply control may be displayed in the display bar. The reply control includes a type of virtual gifts and a control for controlling the number of virtual gifts. The anchor selects the number of virtual gifts through this control, and then clicks the send button to send virtual gifts to the fans in batches on the page of the private message. As such, it is solved the problem that the anchor may not send gifts to the fans in batches in the private message interaction.

Figure 2:
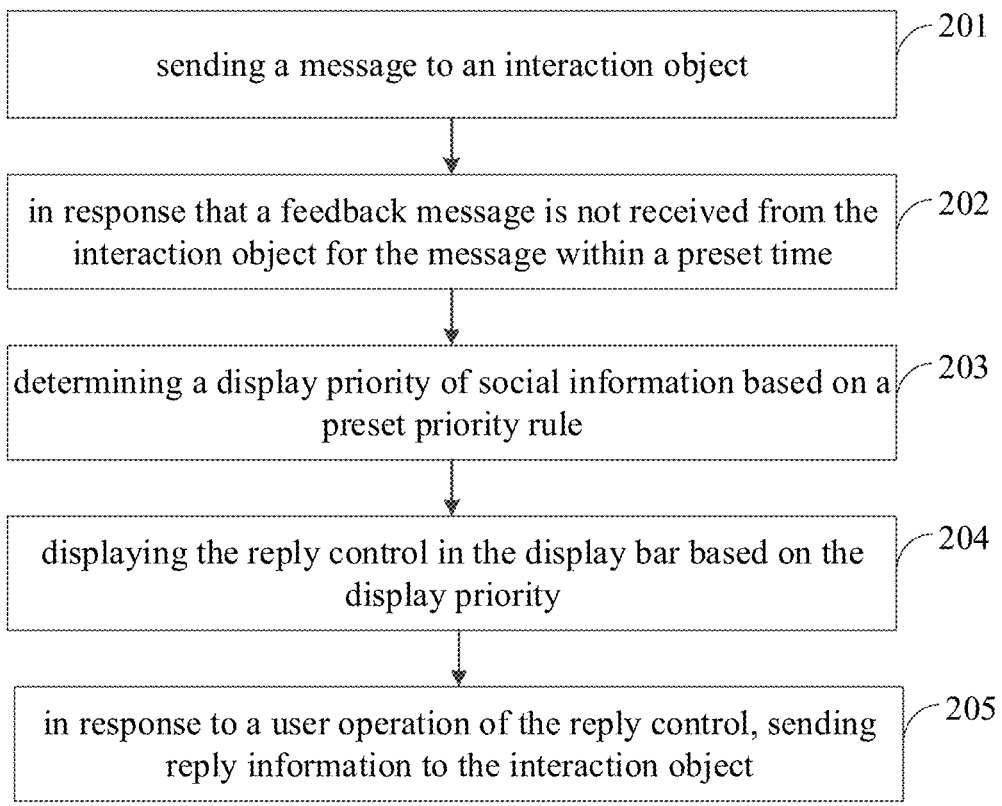
FIG. 2 is a schematic flowchart of another method for processing social information according to an embodiment of the present disclosure.

FIG. 2 is a schematic flowchart of a method for processing social information according to an embodiment of the disclosure.

As shown in FIG. 2, the method includes the following steps.

At 201, a message is sent to the interaction object.

At 202, in response that a feedback message is not received from the interaction object for the message within a preset time, the steps at 203 to 204 are performed.

At 203, a display priority of social information is determined based on a preset priority rule.

At 204, a reply control is displayed in a display bar based on the display priority.

The reply control is displayed in the display bar, and the reply control includes: at least two pieces of social information and controls for selecting a number of pieces of social information corresponding to the at least two pieces of social information one by one.

At 205, in response to a user operation of the reply control, reply information is sent to the interaction object. The reply information includes social information selected by a user and a number of pieces of social information.

The social information may be social information of a virtual gift type, or may be social information of an emoticon type. Taking the social information of the virtual gift type as an example, the social information is a thumbnail of the virtual gift, and a number control is a control for controlling the number of virtual gifts.

In an embodiment, the social information includes a virtual gift and an emoticon. Determining the display priority of a plurality of pieces of social information based on the preset priority rule includes: determining the display priority of the virtual gift is higher than the display priority of the emoticon.

In another embodiment, the social information includes virtual gifts. Determining the display priority of social information based on the preset priority rule includes: determining a display priority of virtual gifts according to a ranking list of giving the virtual gifts and based on gender information of the interaction object.

Further, the above message sent to the interaction object is a private message. If the feedback message is not received from the interaction object for the private message within the preset time, the display bar may be displayed on the page of the private message, and the reply control may be displayed in the display bar. In this embodiment, giving gifts in batches mainly performs on the interaction page of the private message, so as to solve the problem that gifts may not be given in batches during private message interaction.

This embodiment may be illustrated by the following scenarios.

In a scenario where fans give gifts to the anchor, the fans send private messages to the anchor. If the anchor does not reply to the message within the preset time, a display bar may be displayed on the page of the private message. In a case, a reply control is displayed in the display bar, and the reply control includes a virtual gift type and an emoticon type, in which the display priority of the virtual gift type is higher than the display priority of the emoticon type. The reply control also includes controls for controlling the number of virtual gifts and emoticons. The fans may select the number of virtual gifts and emoticons through the controls, and then click a send button to send virtual gifts or emoticons to the anchor in batches on the page of the private message. In another case, a reply control is displayed in the display bar, and the reply control includes a virtual gift type. According to a ranking list of giving the virtual gifts, the priority for displaying virtual gift information may be determined based on gender information of the interaction object. For example, if the interaction object is a woman, the virtual gifts are displayed in sequence in the display bar according to the ranking list of women's giving the virtual gifts, such as cakes and flowers. The fans may select the number of virtual gifts through this control, and then click the send button to send virtual gifts to the anchor in batches on the page of the private message. As such, it is solved the problem that the fans may not send gifts to the anchor in batches in the private message interaction.

In another scenario where the anchor gives gifts to fans, which is similar to the above-mentioned scenario where the fans give gifts to the anchor, and will not be repeated here.

In the method for processing social information according to this embodiment, the message is sent to the interaction object, and if the feedback message is not received from the interaction object for the message within the preset time, the display bar is displayed on the page, in which the display bar is displayed with reply controls for selecting multiple pieces of social information. In this embodiment, the pieces of social information may be selected in batches. In response to the user operation of the reply control, reply information is sent to the interaction object, in which the reply information includes social information selected by the user and a number of pieces of social information. Therefore, social information in this embodiment may be sent in batches, quick replies of a large number of social information that meet the needs are provided for users, the timeliness of information interaction is improved, and the stickiness to the platform is increased.

Figure 3:
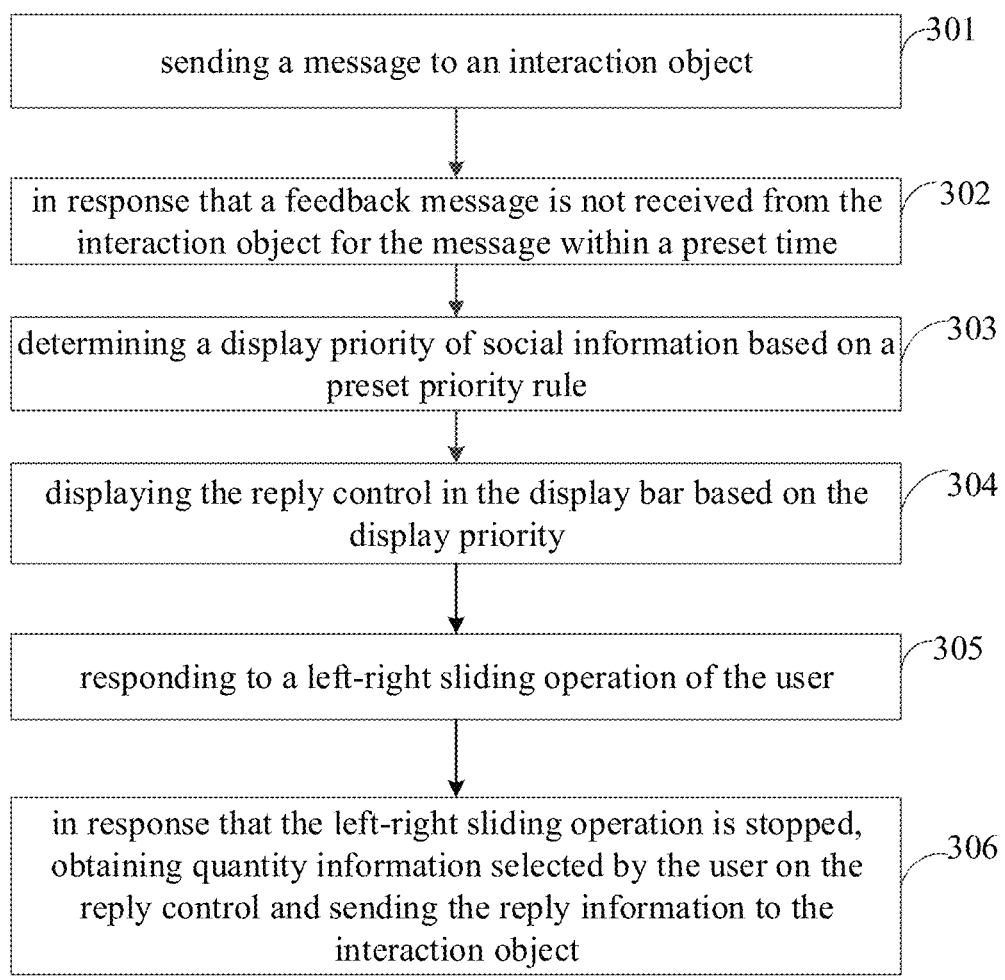
FIG. 3 is a schematic flowchart of another method for processing social information according to an embodiment of the present disclosure.

FIG. 3 is a schematic flowchart of a method for processing social information according to an embodiment of the disclosure.

As shown in FIG. 3, the method includes the following steps.

At 301, a message is sent to the interaction object.

Figure 4:
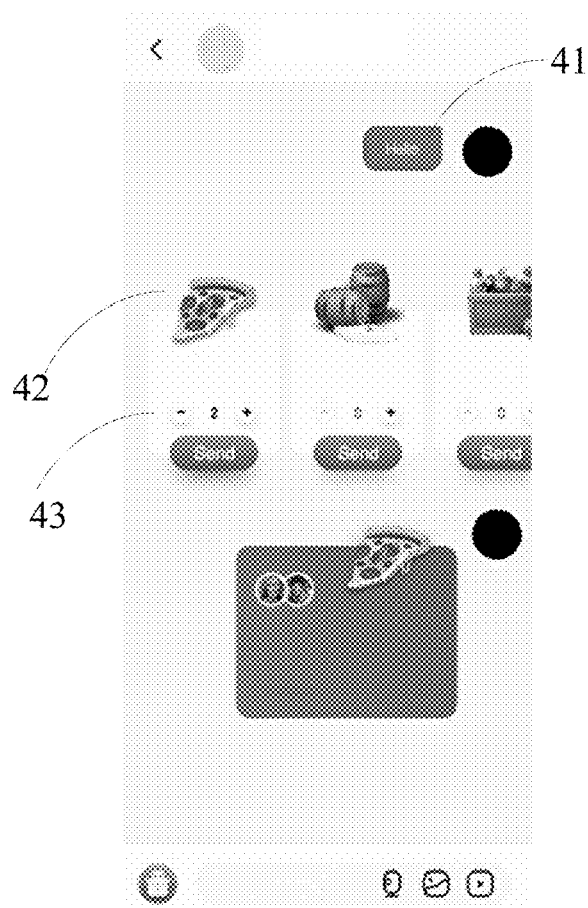
FIG. 4 is a schematic diagram of processing social information according to an embodiment of the present disclosure.

Referring to FIG. 4, a message 41 is sent to the interaction object. The interaction object refers to a user who has interactive needs, such as an anchor, fans of the anchor, and the like. The content of the message is different, and the type of the corresponding content is different. The message may be in a chat type and in an emoticon type. The message in the chat type is, for example, a text message. The message in the emoticon type is an emoji symbol.

At 302, in response that a feedback message is not received from the interaction object for the message within a preset time, the steps at 303 to 304 are performed.

At 303, a display priority of social information is determined based on a preset priority rule.

At 304, a reply control is displayed in a display bar based on the display priority.

The reply control is displayed in the display bar, and the reply control includes at least two pieces of social information and controls for selecting a number of pieces of social information corresponding to the at least two pieces of social information one by one.

At 305, a left-right sliding operation of the user is responded.

At 306, in response that the left-right sliding operation is stopped, number information selected by the user on the reply control is obtained and the reply information is sent to the interaction object. The reply information includes social information selected by a user and a number of pieces of social information.

The social information may be social information of a virtual gift type, or may be social information of an emoticon type. Taking the social information of the virtual gift type as an example, the social information is a thumbnail of the virtual gift, and a number control is a control for controlling the number of virtual gifts.

In an embodiment, the social information includes a virtual gift and an emoticon. Determining the display priority of a plurality of pieces of social information based on the preset priority rule includes: determining the display priority of the virtual gift is higher than the display priority of the emoticon.

In another embodiment, the social information includes virtual gifts. Determining the display priority of social information based on the preset priority rule includes: determining a display priority of virtual gifts according to a ranking list of giving the virtual gifts and based on gender information of the interaction object.

As shown in FIG. 4, when there are at least two pieces of social information in the reply control, they may be sequentially displayed from left to right in the display bar in an order of the display priority. When the user selects social information, the user may slide the display bar left and right to select social information 42 to be sent and the number 43 of the social information in the display bar.

Further, the above message sent to the interaction object is a private message. If the feedback message is not received from the interaction object for the private message within the preset time, a display bar may be displayed on the page of the private message, and a reply control may be displayed in the display bar. In this embodiment, giving gifts in batches mainly performs on the interaction page of the private message, so as to solve the problem that gifts may not be given in batches during the private message interaction.

In the method for processing social information according to this embodiment, the message is sent to the interaction object, and if the feedback message is not received from the interaction object for the message within the preset time, the display bar is displayed on the page, in which the display bar is displayed with reply controls for selecting multiple pieces of social information and the social information in the display bar is sequentially displayed from left to right in the order of display priority. The users may swipe the screen left and right to browse social information. After the user selects the social information, the reply information is sent to the interaction object in response to the user operation of the reply control, in which the reply information includes the social information selected by the user and a number of pieces of social information. Therefore, Therefore, social information in this embodiment may be sent in batches, quick replies of a large number of social information that meet the needs are provided for users, the timeliness of information interaction is improved, and the stickiness to the platform is increased.

In order to implement the above embodiments, the disclosure further provides an apparatus for processing social information.

Figure 5:
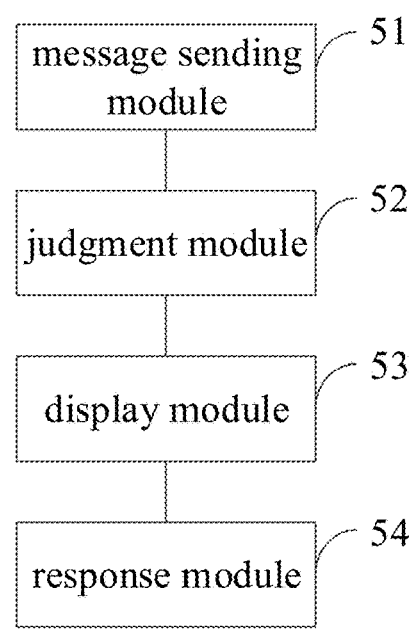
FIG. 5 is a structural schematic diagram of an apparatus for processing social information according to an embodiment of the present disclosure.

FIG. 5 is a schematic structural diagram of an apparatus for processing social information according to an embodiment of the disclosure.

As shown in FIG. 5, the apparatus for processing social information includes: a message sending module 51, a judgment module 52, a display module 53, and a response module 54.

The message sending module 51 is configured to send a message to an interaction object.

The judging module 52 is configured to judge whether a feedback message is received from the interaction object for the message within a preset time.

In response that the feedback message is not received from the interaction object for the message within the preset time, the display module 53 is configured to display a reply control in a display bar, in which the reply control includes: social information and a control for controlling a number of pieces of social information.

The response module 54 is configured to in response to a user operation of the reply control, send reply information to the interaction object, in which the reply information includes social information selected by a user and a number of pieces of social information.

Further, in a possible implementation of the embodiments of the disclosure, the reply control includes: at least two pieces of social information and controls for selecting a number of pieces of social information corresponding to the at least two pieces of social information one by one.

The apparatus device also includes a priority determination module, configured to determine a display priority of social information based on a preset priority rule.

The display module is configured to display the reply control in the display bar based on the display priority.

As a possible implementation, the response module includes: a sliding response sub-module and a selection sub-module.

The sliding response sub-module is configured to respond to a left-right sliding operation of the user.

The selection sub-module is configured to in response that the left-right sliding operation is stopped, obtain number information selected by the user on the reply control and send the reply information to the interaction object.

As a possible implementation, the social information includes a virtual gift and an emoticon.

the priority determination module includes: a first determination sub-module.

The first determination sub-module is configured to determine the display priority of the virtual gift is higher than the display priority of the emoticon.

As a possible implementation, the social information includes virtual gifts.

The priority determination module includes: a second determination sub-module

The second determination sub-module is configured to determine a display priority of virtual gifts according to a ranking list of giving the virtual gifts and based on gender information of the interaction object.

As a possible implementation, the message is a private message.

The display module includes a private message page display module, configured to display the display bar on a page of the private message, and display the reply control in the display bar.

In the apparatus for processing social information according to this embodiment, the message is sent to the interaction object, and if the feedback message is not received from the interaction object for the message within the preset time, the display bar is displayed on the page, in which the display bar is displayed with reply controls for selecting multiple pieces of social information. In this embodiment, the pieces of social information may be selected in batches. In response to the user operation of the reply control, reply information is sent to the interaction object, in which the reply information includes social information selected by the user and a number of pieces of social information. Therefore, social information in this embodiment may be sent in batches, quick replies of a large number of social information that meet the needs are provided for users, the timeliness of information interaction is improved, and the stickiness to the platform is increased.

Figure 6:
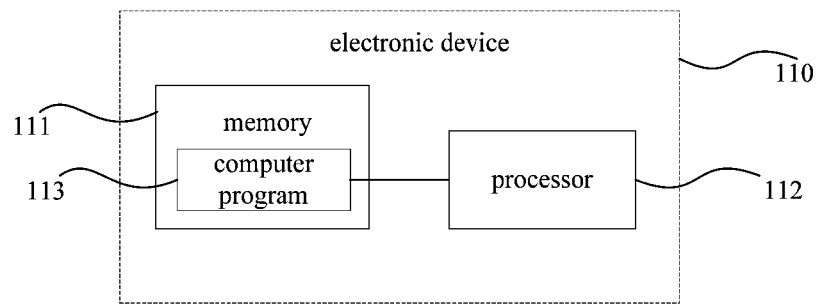
FIG. 6 is a structural schematic diagram of an electronic device according to an embodiment of the present disclosure.

In order to implement the above embodiments, an embodiment of the disclosure provides an electronic device. FIG. 6 is a structural schematic diagram of the electronic device according to the embodiment of the disclosure. As shown in FIG. 6, the electronic device 110 includes a memory 111, a processor 112 and a computer program 113 that is stored in the memory 111 and may be executed on the processor 112. When the processor 112 executes the program 113, the method for processing social information described in the above method embodiments is implemented.

In order to implement the above embodiments, an embodiment of the disclosure provides a computer-readable storage medium on which a computer program is stored, and when the computer program is executed by a processor, the method for processing social information described in the above method embodiments is implemented.

In the description of this specification, description with reference to the terms "an embodiment," "some embodiments," "an example," "a specific example," or "some examples", etc., mean a particular feature, structure, material, or characteristic described in connection with the embodiment or example is included in at least one embodiment or example of the disclosure. In this specification, schematic representations of the above terms are not necessarily directed to the same embodiment or example. Furthermore, the particular features, structures, materials or characteristics described may be combined in any suitable manner in any one or more embodiments or examples. In addition, different embodiments or examples and features of different embodiments or examples described in the specification may be combined by those skilled in the art without mutual contradiction.

In addition, the terms "first" and "second" are only used for purposes of description, and are not intended to indicate or imply relative importance or the number of indicated technical features. Thus, the feature defined with "first", "second" may expressly or implicitly include at least one of that feature. In the description of the disclosure, "plurality" means at least two, such as two, three, etc., unless expressly and specifically defined otherwise.

Any process or method description in the flowcharts or otherwise described herein may be understood to represent a module, a segment or a portion of codes comprising one or more executable instructions for implementing specific logical functions or steps in the process, and the scope of a preferred embodiment of the disclosure includes alternative implementations in which the functions may be performed out of the order shown or discussed, including performing the functions in a substantially simultaneous manner or in the flipped order according to the functions involved, to perform the functions, which should be understood by those skilled in the art.

The logic and/or steps represented in flowcharts or otherwise described herein, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or N wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that various parts of this application may be implemented in hardware, software, firmware or their combination. In the above-described embodiments, various steps or methods may be implemented in software or firmware stored in memory and executed by a suitable instruction execution system. For example, if it is realized by the hardware, likewise in another embodiment, the steps or methods may be realized by one or a combination of the following techniques known in the art: discrete logic circuits having logic gate circuits for realizing a logic function of a data signal, an application-specific integrated circuit having an appropriate combination logic gate circuit, a programmable gate array (PGA), a field programmable gate array (FPGA), etc.

It may be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disk or an optical disk, and the like. Although explanatory embodiments have been shown and described, it would be appreciated by those skilled in the art that the above embodiments cannot be construed to limit the disclosure, and changes, alternatives, and modifications may be made in the embodiments without departing from scope of the disclosure.

What is claimed is:

1. A computer-implemented method for processing social information, comprising:
    sending a message to an interaction object;
    in response that a feedback message is not received from the interaction object for the message within a preset time, displaying a reply control in a display bar of an interaction interface, wherein the reply control comprises: at least two pieces of social information and at least two number controls, each number control being used for selecting a number of each piece of social information; and
    in response to a user operation of the reply control, sending reply information to the interaction object, wherein the reply information comprises social information selected by a user and a number of the social information selected, the number being greater than 1.

2. The method of claim 1, further comprising:
    determining a display priority of social information based on a preset priority rule; and
    displaying the reply control in the display bar of the interaction interface based on the display priority.

3. The method of claim 2, wherein in response to the user operation of the reply control, sending reply information to the interaction object comprises:
    in response that a left-right sliding operation of the user on the reply control is stopped, obtaining number information selected by the user and sending the reply information to the interaction object.

4. The method of claim 2, wherein the at least two pieces of social information comprises a virtual gift and an emoticon; and
    wherein the display priority of the virtual gift is higher than the display priority of the emoticon.

5. The method of claim 2, wherein the at least two pieces of social information comprises virtual gifts; and determining the display priority of social information comprises:
    determining a display priority of virtual gifts according to a ranking list of giving the virtual gifts and based on gender information of the interaction object.

6. The method of claim 1, wherein the message is a private message;
    and displaying the reply control in the display bar of the interaction interface comprises:
    displaying the display bar on a page of the private message, and displaying the reply control in the display bar.

7. An electronic device, comprising:
    a processor, and
    a memory configured to store with a computer program executable by the processor;
    wherein the processor is configured to:
        send a message to an interaction object;
        in response that a feedback message is not received from the interaction object for the message within a preset time, display a reply control in a display bar of an interaction interface, wherein the reply control comprises: at least two pieces of social information and at least two number controls, each number control being used for selecting a number of each piece of social information; and
        in response to a user operation of the reply control, send reply information to the interaction object, wherein the reply information comprises social information selected by a user and a number of the social information selected, the number being greater than 1.

8. The electronic device of claim 7, wherein the processor is further configured to:
    determine a display priority of social information based on a preset priority rule; and
    display the reply control in the display bar of the interaction interface based on the display priority.

9. The electronic device of claim 8, wherein the processor is further configured to:
    in response that a left-right sliding operation of the user on the reply control is stopped, obtain number information selected by the user and send the reply information to the interaction object.

10. The electronic device of claim 8, wherein the at least two pieces of social information comprises a virtual gift and an emoticon; and
    wherein the display priority of the virtual gift is higher than the display priority of the emoticon.

11. The electronic device of claim 8, wherein the at least two pieces of social information comprises virtual gifts; and the processor is further configured to:
    determine a display priority of virtual gifts according to a ranking list of giving the virtual gifts and based on gender information of the interaction object.

12. The electronic device of claim 7, wherein the message is a private message; and the processor is further configured to:
    display the display bar on a page of the private message, and display the reply control in the display bar.

13. A non-transitory computer-readable storage medium on which a computer program is stored, wherein when the program is executed by a processor, a method for processing social information is implemented, the method comprising:
    sending a message to an interaction object;
    in response that a feedback message is not received from the interaction object for the message within a preset time, displaying a reply control in a display bar of an interaction interface, wherein the reply control comprises: at least two pieces of social information and at least two number controls, each number control being used for selecting a number of each piece of social information; and
    in response to a user operation of the reply control, sending reply information to the interaction object, wherein the reply information comprises social information selected by a user and a number of the social information selected, the number being greater than 1.

14. The storage medium of claim 13, wherein the method further comprises:
    determining a display priority of social information based on a preset priority rule; and
    displaying the reply control in the display bar of the interaction interface based on the display priority.

15. The storage medium of claim 14, wherein in response to the user operation of the reply control, sending reply information to the interaction object comprises:
    in response that a left-right sliding operation of the user on the reply control is stopped, obtaining number information selected by the user and sending the reply information to the interaction object.

16. The storage medium of claim 14, wherein the at least two pieces of social information comprises a virtual gift and an emoticon; and
    wherein the display priority of the virtual gift is higher than the display priority of the emoticon.

17. The storage medium of claim 14, wherein the at least two pieces of social information comprises virtual gifts; and determining the display priority of social information comprises:
    determining a display priority of virtual gifts according to a ranking list of giving the virtual gifts and based on gender information of the interaction object.

18. The storage medium of claim 13, wherein the message is a private message; and displaying the reply control in the display bar of the interaction interface comprises:
    displaying the display bar on a page of the private message, and displaying the reply control in the display bar.

* * * * *